United States Patent [19]

Oftedal et al.

[11] Patent Number: 4,664,674
[45] Date of Patent: May 12, 1987

[54] METHOD OF MAKING A PRIMING DEVICE FOR A HEATING UNIT

[75] Inventors: Tor A. Oftedal, Oslo; Thomas Ramdahl, Jar, both of Norway

[73] Assignee: Forsvarets Forskningsinstitutt, Kjeller, Norway

[21] Appl. No.: 694,890

[22] Filed: Jan. 25, 1985

Related U.S. Application Data

[63] Continuation of Ser. No. 562,946, Dec. 19, 1983, abandoned.

[30] Foreign Application Priority Data

Jan. 31, 1983 [NO] Norway ................................ 830309

[51] Int. Cl.$^4$ ...................... C10L 11/00; C10L 11/06
[52] U.S. Cl. ........................................... 44/39; 44/41; 102/202; 102/202.5; 126/206; 126/263; 149/20; 431/258; 431/268
[58] Field of Search ................ 44/6, 39, 41; 126/204, 126/206, 263; 431/258, 267, 268; 102/202, 202.5; 149/20

[56] References Cited

U.S. PATENT DOCUMENTS

| | | | |
|---|---|---|---|
| 1,252,909 | 1/1918 | Low | 126/206 |
| 1,311,274 | 7/1919 | Hansen | 149/20 |
| 2,743,580 | 5/1956 | Loeb, Jr. | 102/202 |
| 2,955,535 | 10/1960 | Show et al. | 149/20 |
| 3,515,525 | 6/1970 | Fearon | 44/38 |
| 3,809,526 | 5/1974 | Nordli et al. | 126/263 X |
| 3,955,937 | 5/1976 | Whang | 44/41 X |

FOREIGN PATENT DOCUMENTS 636004  4/1950  United Kingdom ............... 44/6

Primary Examiner—Carl F. Dees
Attorney, Agent, or Firm—T. L. Peterson; J. S. Christopher

[57] ABSTRACT

A method of making priming devices for a fuel element is disclosed. A high quality priming device is obtained by treating suitable pieces of cellulose with catalyzing agents such as manganates or permanganates and with oxidizing agents such as inorganic oxidizing salts. Such priming devices are very reliable and may be used in portable personnel heaters, e.g. to keep injured people warm after accidents.

21 Claims, 3 Drawing Figures

METHOD OF MAKING A PRIMING DEVICE FOR A HEATING UNIT

This application is a continuation of the U.S. patent application Ser. No. 562,946 filed on Dec. 19, 1983 (now abandoned).

BACKGROUND OF THE INVENTION

The present invention relates to a method of making a small, lightweight priming device for a fuel element, and more particularly to a priming device having a simple and reliable design.

PRIOR ART STATEMENT

In U.S. Pat. No. 3,809,526 (Nordli et al), a heating unit is disclosed. This heating unit comprises a fuel element substantially consisting of carbon and which is arranged in a box of heat conducting material with a layer of heat insulating material between the fuel element and the box. Ignition means and air supply means are arranged to supply combustion air during and after ignition so that the air flow is defined resulting in a predetermined heat effect.

The heating unit may include temperature detection means arranged in close contact with the object to be heated, and switching means controlled by the temperature detection means to control the flow of air supplied by the air supply means. A certain minimum flow is maintained for the life of the fuel element. The rate of which the fuel element is combusted is thereby controlled.

The air supply means may comprise a motor driven fan which is operated from a dry cell battery.

By using thermostatic regulation, the combustion may be made very slow—of the order of several days.

The fuel element is preferably made from carbon with additions of binders and combustion catalysts pressed into briquettes. There is then obtained high combustion heat of about 8 kcal/g—as compared to 2 kcal/g by using pyrotechnical cartridges consisting of oxidizable metal and an oxidizing agent.

There are further advantages of carbon over hydrocarbons. The exhaust gases have a low content of humidity. That is, they have a dew point of about 10° C., as compared to about 60° C., by combustion of hydrocarbons. This is of great importance when using the heater at low temperatures. The tendancy of icing is reduced at such low temperatures and there are negligible problems due to any plugging of the exhaust outlet.

Use of carbon in the above-mentioned form is also of advantage because the exhaust gases are odorless, smokeless and non-poisonous as the amounts of hazardous gases like carbon monoxide are very low.

Further, use of carbon is very advantageous because it is inexpensive and it does not act as a fire hazard when it is stored.

A heating unit of this type may have many applications. It may, e.g., be used in an ambulance stretcher to keep injured persons warm after accidents. The heater will in these cases be of particular importance for patients in shock.

SUMMARY OF THE INVENTION

Difficulties have, however, arisen in obtaining suitable priming or ignition devices for such heating units, and the object of the present invention is to overcome the drawbacks of previously known ignitors.

The following characteristics are required of a priming device to be used in connection with carbon or charcoal briquette heating units:

1. High ignition reliability under all conditions.
2. Rapid start of coal glowing.
3. Simple and inexpensive manufacturing process.
4. Wide tolerances during preparation of the device.
5. No restriction of further combustion of the coal briquette.
6. No production of poisonous or corrosive gases.
7. Must not poison a possible catalyzer device.
8. If the charcoal briquette is provided with a priming device in each end, the first ignited priming device must not produce sparks which may ignite the other priming device.
9. When the charcoal briquette is fully combusted and the priming device is ignited by the heat, this device must not react so violently that the fuel element cartridge or box is damaged.
10. The priming device should have a high moisture resistance so that it can be easily stored. Alternatively, the packaging for the charcoal briquettes should be diffusion proof against vapor and steam.
11. The priming device should be chemically and physically stable so that it does not decompose or disappear from its mounting place on the briquette either by vaporization or sublimation or by being absorbed into the briquette due to capillary forces. The chemical components included in the priming device must not react with each other or with substances from their surroundings such as water and oxygen.
12. The priming device must have a high heat sensitivity even at low temperatures so that it may easily be ignited with a powder ignitor or with a match.

From the literature there are several known types of charcoal briquettes as represented, for instance, by U.S. Pat. Nos. 3,337,312 (T. G. Perlus) and 3,385,681 (F. C. Mennen). These types of charcoal briquettes, which primarily are suitable for cooling food, have primers in the form of coatings on or in the briquettes. Extensive experiments have, however, proved that these types of briquettes have serious drawbacks. It has proved to be impossible to find a suitable ratio between the amount of the oxidizing agent and charcoal powder. The result was otherwise that ignition was too slow or too fast. Furthermore, it was discovered that use of carbon as a combustion agent gave an undesirable sparking effect.

As a contrast to the arrangement of the ignition device in U.S. Pat. No. 3,809,526 where it is mounted within a hollow in the fuel element, the priming device of the present invention may be placed in a flat surface contact with the fuel element. It may be pressed between the box wall and the fuel element or glued to the fuel element.

BRIEF DESCRIPTION OF THE DRAWINGS

In the accompanying drawings which illustrate exemplary embodiments of the present invention.

DESCRIPTION OF THE PREFERRED EMBODIMENT

The priming device is made by starting out from a piece of cellulose or pressed wood pulp like sulphite cellulose. Such pieces which could later be cut to desirable size relative to the fuel element are treated by one or more solutions containing catalyzing and oxidizing agents. A combined solution or bath may be used, or separate solution baths for the catalyzing and oxidizing agents may be used.

As catalyzing agents, salts of alkali metals may be used. For example, potassium manganate $K_2MnO_4$ or potassium permanganate $KMnO_4$ may be used. Sodium manganate $Na_2MnO_4$ may also be used as is the case for sodium permanganate $NaMnO_4$. Alternatively, the corresponding ammonium salts $(NH_4)_2MnO_4$ and $NH_4MnO_4$ may be used as is also true for the corresponding salts of earth alkali metals including magnesium, calcium and barium.

As an oxidizing agent, inorganic oxidizing salts may be chosen from the anion group of chlorates, perchlorates and nitrates. Preferably, ammonium perchlorate $NH_4ClO_4$ is used.

In the case of a two bath process, the cellulose pieces should be soaked in a first solution containing the said catalyzing salts in an amount of 0.1–5% dissolved in water during a time period depending upon the temperature of the solution. Within a temperature range of from 60° C. to 90° C., the soaking time required could be as short as 15 minutes.

After withdrawal from the first bath, superfluous solution may drip off. Then the cellulose pieces are soaked for at least ten minutes in a second bath containing the oxidizing agent having a temperature within a range of from 60° C. to 90° C.

The second bath should contain at least 20 parts by weight to 100 parts of water. Again, the soaking time is dependent on the bath temperature.

After treatment in the two baths or in a combined solution bath, the cellulose pieces are dried completely before being mounted on the carbon fuel elements. As an intermediate step the dried pieces may be stored in dry surroundings. The priming device and carbon fuel element of the defined type may, however, be stored in relatively humid environments without losing the desired properties. Samples stored at 75% RH for 8 months showed excellent ignition and combustion properties.

Figure 1:
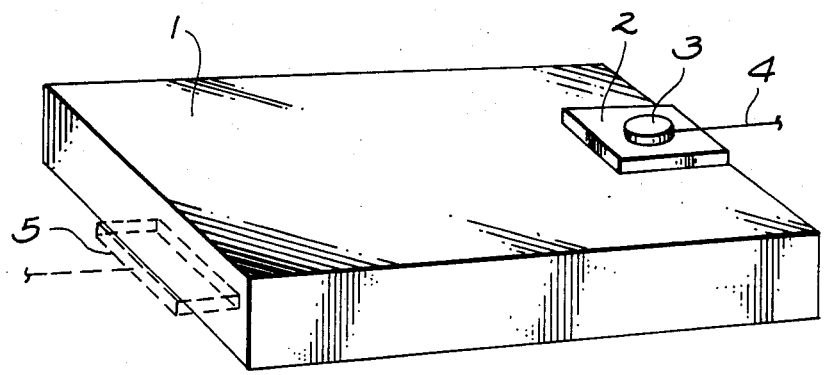
FIG. 1 is a perspective view of a fuel element and a priming device.

In FIG. 1 a fuel element 1 is shown on which is placed a priming device 2. An electric fuse 3 is placed in contact with the priming device 2 and electric wiring 4 leads to an external battery (not shown). The electric fuse arrangement may be substituted with a powder fuse arrangement. An additional priming assembly 5 may be arranged on the other end of the fuel element. The priming device 2 may, e.g., be glued to the fuel element 1.

Figure 2:
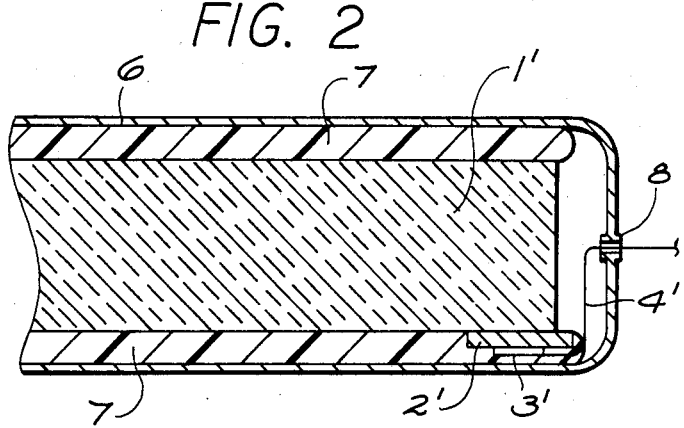
FIG. 2 is a broken away transverse sectional view of the priming device of FIG. 1 with a fuse arrangement.

In FIG. 2 another priming device 2' is shown with a fuse arrangement 3' pressed into contact with a fuel element 1' by means of a box cover 6 including also layers of heat insulation material 7. Wiring 4' is electrically insulated from the box inlet by means of a bushing 8.

Figure 3:
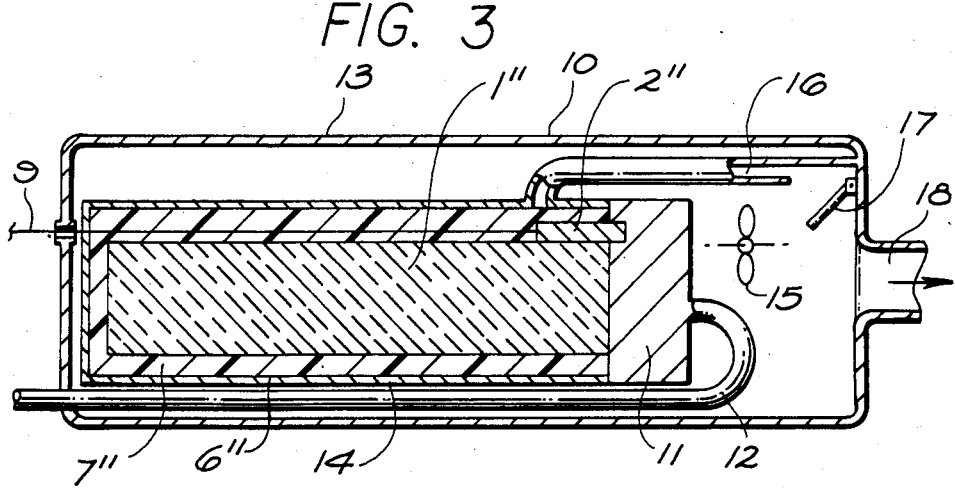
FIG. 3 is an enlarged transverse sectional view of a heating unit constructed in accordance with the present invention.

In FIG. 3 an embodiment of a heating unit is shown which may use a priming device 2" made with the present invention. Priming device 2" is shown attached to a fuel element 1", a powder fuse or electric wiring 9 being brought out of the heating unit housing 10. The fuel element 1" is, as mentioned, enclosed in heat insulation material 7" within its box 6". Exhaust gases should preferably be passed through a catalyzing device 11 before being expelled through a pipe 12. The catalyst 11 may have a honeycomb structure of platinum whereby CO gases are catalyzed to $CO_2$ gases.

A fan 15 provides combustion air and air for distributing the heat from the heating unit. The air enters the unit through apertures 13 in the housing 10. The combustion air flows through a pipe 16 and openings 14 into the fuel element box. A bimetallic thermostat arrangement 17 controls the flow of combustion air, thereby obtaining a fixed predetermined temperature of the warm air which is used for the heat distribution. A similar arrangement may also be inserted into the warm air outlet 18 so that during the starting up period this outlet is partially closed and most of the air supplied by the fan 15 is used to start the combustion. The priming device 2" of the present invention will after being ignited be glowing for several minutes and efficiently start the combustion of the fuel element 1". The fuel element stick 1" is preferably ignited at the end in the vicinity of the catalyst 11 in order to start the catalytic combustion as soon as possible. Started at this end, the glowing zone then moves upstream. The combustion air then moves towards the other end, whereupon the combustion will proceed to the right until the fuel element 1" is completely combusted. The fuel element 1" may be provided with longitudinal grooves and ridges in order to improve the air flow and combustion control. The priming device 2" may be placed in contact with one or more of the edge portions of the fuel element 1" to improve transfer of heat from the priming device 2" to the fuel element 1".

Hoses may be attached to the warm air outlet for distribution of heat to technical equipment or to personnel. Alternatively, the heating unit may be placed in direct contact with the object to be heated.

The invention may be described as a method of making heating apparatus. The method may include providing a fuel element including carbon; providing a priming device including a sheet of cellulose material; treating said sheet with a solution containing catalyzing and oxidizing agents; drying said sheet; and subsequently placing said sheet on said fuel element, characterized in this that the catalyzing agent contains salts of alkali metals including potassium ($KMnO_4$, $K_2MnO_4$) and sodium $NaMnO_4$, $Na_2MnO_4$) and the corresponding ammonium salts [$NH_4MnO_4$, $(NH_4)_2MnO_4$], and that it contains metals including magnesium, calcium and barium.

What is claimed is:

1. The method of making portable personnel heating apparatus, said method comprising the steps of:
   providing a fuel element comprising carbon;
   providing a priming device for said fuel element including a sheet of cellulose material;
   treating said sheet of cellulose material with catalyzing and oxidizing agents;
   drying said sheet of cellulose material and subsequently placing said sheet on said fuel element,
   characterized in this that during the treatment step said sheet of cellulose material is during a first time period treated with a first solution containing a catalyzing agent including manganates and permanganates such as salts of alkali metals including potassium ($KMnO_4$, $K_2MnO_4$), wherein said cellulose material is soaked in said first solution for at least fifteen minutes, said first soaking solution having a temperature between sixty and ninety degrees centigrade and containing an active catalyzing material in the range of from 0.1 and 5, said active catalyzing material being dissolved in water, followed by treatment of said sheet of cellulose material during a second time period with a second solution containing an oxidizing agent including inorganic oxidizing salts chosen from the anion groups of chlorates, perchlorates and nitrates, including ammonium perchlorate ($NH_4ClO_4$), wherein said cellulose material is soaked in said second solution for at least ten minutes, said second soaking solution having a temperature between sixty and ninety degrees centigrade and containing at least twenty parts by weight of said oxidizing agent to one-hundred parts of water and wherein said sheet of cellulose material being comprised of suphite cellulose.

2. The method of making portable personnel heating apparatus, said method comprising the steps of:
providing a fuel element comprising carbon;
providing a priming device for said fuel element including a sheet of cellulose material;
treating said sheet of cellulose material with catalyzing and oxidizing agents;
drying said sheet of cellulose material and subsequently placing said sheet on said fuel element,
characterized in this that during the treatment step said sheet of cellulose material is during a first time period treated with a first solution containing a catalyzing agent including manganates and permanganates such as salts of alkali metals including sodium ($NaMnO_4$, $Na_2MnO_4$),
wherein said cellulose material is soaked in said first solution for at least fifteen minutes, said first soaking solution having a temperature between sixty and ninety degrees centigrade and containing an active catalyzing material in the range of from 0.1 and 5, said active catalyzing material being dissolved in water,
followed by treatment of said sheet of cellulose material during a second time period with a second solution containing an oxidizing agent including inorganic oxidizing salts chosen from the anion groups of chlorates, perchlorates and nitrates, including ammonium perchlorate ($NH_4ClO_4$),
wherein said cellulose material is soaked in said second solution for at least ten minutes, said second soaking solution having a temperature between sixty and ninety degrees centigrade and containing at least twenty parts by weight of said oxidizing agent to one-hundred parts of water and wherein said sheet of cellulose material being comprised of sulphite cellulose.

3. The method of making portable personnel heating apparatus, said method comprising the steps of:
providing a fuel element comprising carbon;
providing a priming device for said fuel element including a sheet of cellulose material;
treating said sheet of cellulose material with catalyzing and oxidizing agents;
drying said sheet of cellulose material and subsequently placing said sheet on said fuel element,
characterized in this that during the treatment step said sheet of cellulose material is during a first time period treated with a first solution containing a catalyzing agent including manganates and permanganates such as salts of alkali metals including ammonium salts ($NH_4MnO_4$, $(NH_4)_2MnO_4$),
wherein said cellulose material is soaked in said first solution for at least fifteen minutes, said first soaking solution having a temperature between sixty and ninety degrees centigrade and containing an active catalyzing material in the range of from 0.1 and 5, said active catalyzing material being dissolved in water,
followed by treatment of said sheet of cellulose material during a second time period with a second solution containing an oxidizing agent including inorganic oxidizing salts chosen from the anion groups of chlorates, perchlorates and nitrates, including ammonium perchlorate ($NH_4ClO_4$),
wherein said cellulose material is soaked in said second solution for at least ten minutes, said second soaking solution having a temperature between sixty and ninety degrees centigrade and containing at least twenty parts by weight of said oxidizing agent to one-hundred parts of water and wherein said sheet of cellulose material being comprised of sulphite cellulose.

4. The method of making portable personnel heating apparatus, said method comprising the steps of:
providing a fuel element comprising carbon;
providing a priming device for said fuel element including a sheet of cellulose material;
treating said sheet of cellulose material with catalyzing and oxidizing agents;
drying said sheet of cellulose material and subsequently placing said sheet on said fuel element,
characterized in this that during the treatment step said sheet of cellulose material is during a first time period treated with a first solution containing a catalyzing agent including manganates and permanganates such as salts of alkali metals including the corresponding salts of earth alkali metals (Mg, Ca, Ba),
wherein said cellulose material is soaked in said first solution for at least fifteen minutes, said first soaking solution having a temperature between sixty and ninety degrees centigrade and containing an active catalyzing material in the range of from 0.1 and 5, said active catalyzing material being dissolved in water,
followed by treatement of said sheet of cellulose material during a second time period with a second solution containing an oxidizing agent including inorganic oxidizing salts chosen from the anion groups of chlorates, perchlorates and nitrates, including ammonium perchlorate ($NH_4ClO_4$),
wherein said cellulose material is soaked in said second solution for at least ten minutes, said second soaking solution having a temperature between sixty and ninety degrees centigrade and containing at least twenty parts by weight of said oxidizing agent to one-hundred parts of water and wherein said sheet of cellulose material being comprised of sulphite cellulose.

5. The method of making portable personnel heating apparatus, said method comprising the steps of:
providing a fuel element comprising carbon;
providing a priming device for said fuel element including a sheet of cellulose material;

treating said sheet of cellulose material with catalyzing and oxidizing agents;

drying said sheet of cellulose material and subsequently placing said sheet on said fuel element, characterized in this that during the treatment step said sheet of cellulose material is during a first time period treated with a first solution containing a catalyzing agent including manganates and permanganates such as salts of alkali metals selected from the group consisting of potassium (KMnO$_4$, K$_2$MnO$_4$), sodium (NaMnO$_4$, Na$_2$MnO$_4$), corresponding ammonium salts (NH$_4$MnO$_4$, (NH$_4$)$_2$MnO$_4$), and corresponding salts of alkali earth metals (Mg, Ca, Ba), wherein said cellulose material is soaked in said first solution for at least fifteen minutes, said first soaking solution having a temperature between sixty and ninety degrees centigrade and containing an active catalyzing material in the range of from 0.1 and 5, said active catalyzing material being dissolved in water, followed by treatment of said sheet of cellulose material during a second time period with a second solution containing an oxidizing agent including inorganic oxidizing salts chosen from the anion groups of chlorates, perchlorates and nitrates, including ammonium perchlorate (NH$_4$ClO$_4$), wherein said cellulose material is soaked in said second solution for at least ten minutes, said second soaking solution having a temperature between sixty and ninety degrees centigrade and containing at least twenty parts by weight of said oxidizing agent to one-hundred parts of water and wherein said sheet of cellulose material being comprised of sulphite cellulose.

6. A method for making a self priming fuel element for use in a portable personnel heating apparatus, the method comprising the following steps:

soaking a sheet of cellulose material in an aqueous solution containing both a catalyzing agent and an inorganic oxidizing agent, then drying the sheet of cellulose material;

whereby the dried sheet of cellulose material retains residues of both the catalyzing agent and the inorganic oxidizing agent, and then adhesively attaching the dried sheet of cellulose material onto the surface of a carbon fuel element, whereby the carbon fuel element with the adhesively attached sheet of cellulose material comprises the self priming fuel element for use in the portable personnel heating apparatus.

7. The method for making a self priming fuel element for use in a portable personnel heating apparatus as described in claim 6 wherein:

in said soaking step, the catalyzing agent selected from the group consisting of alkali metal salts (sodium and potassium), earth alkali salts (magnesium, calcium and barium), and ammonium salts of manganate and permanganate, and the inorganic oxidizing agent selected from the group consisting of oxidizing salts having anion groups of chlorate, perchlorate, and nitrate, including ammonium perchlorate.

8. The method for making a self priming fuel element for use in a portable personnel heating apparatus as described in claim 6 wherein:

in said soaking step, the catalyzing agent is selected from the group consisting of alkali metal salts (sodium and potassium) of manganate and permanganate, and the inorganic oxidizing agent selected from the group consisting of oxidizing salts having anion groups of chlorate, perchlorate, and nitrate, including ammonium perchlorate.

9. The method for making a self priming fuel element for use in a portable personnel heating apparatus as described in claim 6 wherein:

in said soaking step, the catalyzing agent is selected from the group consisting of alkali metal salts (sodium and potassium) of manganate and permanganate, and the inorganic oxidizing agent is ammonium perchlorate.

10. The method for making a self priming fuel element for use in a portable personnel heating apparatus as described in claim 7 wherein:

in said soaking step, the alkali metal salts of the catalyzing agent selected from the group consisting of sodium or potassium.

11. The method for making a self priming fuel element for use in a portable personnel heating apparatus as described in claim 7 wherein:

the sheet of cellulose material having a composition of sulfite cellulose.

12. The method for making a self priming fuel element for use in a portable personnel heating apparatus as described in claim 11 wherein:

in said soaking step, the aqueous solution having a temperature between sixty and ninety degrees centigrade, the aqueous solution having a concentration of the catalyzing agent between 0.1 and 5, the aqueous solution having a concentration of the oxidizing agent of at least twenty parts by weight to one-hundred parts of water, and said first soaking step having a duration of at least fifteen minutes.

13. A method for making a self priming fuel element for use in a portable personnel heating apparatus, the method comprising the following steps:

in a first soaking step, soaking a sheet of cellulose material in a first aqueous solution containing a catalyzing agent, then transferring the sheet of singly cellulose material from the first solution to a second aqueous solution containing an inorganic oxidizing agent, then in a second soaking step, soaking the sheet of cellulose material in the aqueous second solution containing the inorganic oxidizing agent, then drying the sheet of doubly cellulose material;

whereby the dried sheet of doubly cellulose material retains residues of both the catalyzing agent and the inorganic oxidizing agent, and then adhesively attaching the dried sheet of doubly cellulose material onto the surface of a carbon fuel element, whereby the carbon fuel element with the adhesively attached sheet of doubly cellulose material comprises the self priming fuel element for use in the portable personnel heating apparatus.

14. The method for making a self priming fuel element for use in a portable personnel heating apparatus as described in claim 13 wherein:

in said first soaking step, the catalyzing agent selected from the group consisting of alkali metal salts (sodium and potassium), earth alkali salts (magnesium, calcium and barium), and ammonium salts of manganate and permanganate, and in said second soaking step, the inorganic oxidizing agent selected from the group consisting of oxidizing salts having anion groups of chlorate, perchlorate, and nitrate, including ammonium perchlorate.

15. The method for making a self priming fuel element for use in a portable personnel heating apparatus as described in claim 13 wherein:
in said first soaking step, the catalyzing agent is selected from the group consisting of alkali metal salts (sodium and potassium) of manganate and permanganate, and
in said second soaking step, the inorganic oxidizing agent selected from the group consisting of oxidizing salts having anion groups of chlorate, perchlorate, and nitrate, including ammonium perchlorate.

16. The method for making a self priming fuel element for use in a portable personnel heating apparatus as described in claim 13 wherein:
in said first soaking step, the catalyzing agent is selected from the group consisting of alkali metal salts (sodium and potassium) of manganate and permanganate, and
in said second soaking step, the inorganic oxidizing agent is ammonium perchlorate.

17. The method for making a self priming fuel element for use in a portable personnel heating apparatus as described in claim 14 wherein:
in said first soaking step, the alkali metal salts of the catalyzing agent selected from the group consisting of sodium and potassium.

18. The method for making a self priming fuel element for use in a portable personnel heating apparatus as described in claim 14 wherein:
the sheet of cellulose material having a composition of sulfite cellulose.

19. The method for making a self priming fuel element for use in a portable personnel heating apparatus as described in claim 18 wherein:
in said first soaking step, the first aqueous solution having a temperature between sixty and ninety degrees centigrade, the first aqueous solution having a concentration of the catalyzing agent between 0.1 and 5, and said first soaking step having a duration of at least fifteen minutes, and
in said second soaking step, the second aqueous solution having a temperature between sixty and ninety degrees centigrade, the second aqueous solution having a concentration of the oxidizing agent of at least twenty parts by weight to one-hundred parts of water, and said second soaking step having a duration of at least ten minutes.

20. A self priming fuel element for use in a portable personnel heating apparatus made by the method described in claim 8.

21. A self priming fuel element for use in a portable personnel heating apparatus made by the method described in claim 13.

* * * * *